(12) United States Patent
Stuck

(10) Patent No.: US 6,223,650 B1
(45) Date of Patent: May 1, 2001

(54) APPARATUS FOR CONVEYORIZED TOASTING OF BREADS AND LIKE FOOD ITEMS

(76) Inventor: Robert M. Stuck, 419 Peachtree Dr. South, Charlotte, NC (US) 28217

( * ) Notice: Subject to any disclaimer, the term of this patent is extended or adjusted under 35 U.S.C. 154(b) by 0 days.

(21) Appl. No.: 09/656,035

(22) Filed: Sep. 8, 2000

Related U.S. Application Data

(60) Provisional application No. 60/157,185, filed on Sep. 30, 1999.

(51) Int. Cl.[7] .............................. A47J 37/00; A47J 37/08; F27B 9/36
(52) U.S. Cl. ................................ 99/386; 99/349; 99/390; 99/393; 99/423; 99/443 C
(58) Field of Search ............................. 99/331–334, 336, 99/385, 386, 389–399, 361, 369, 443 R, 443 C, 374, 377–379, 397, 402, 388, 349, 351, 427, 423; 219/492, 497, 521, 386, 388, 40; 426/523, 520

(56) References Cited

U.S. PATENT DOCUMENTS

| | | | |
|---|---|---|---|
| 3,400,651 | * 9/1968 | Hatch | 219/388 |
| 3,611,913 | * 10/1971 | McGinley | 99/386 |
| 3,646,879 | 3/1972 | Palmason et al. | 99/339 |
| 3,693,452 | 9/1972 | McGinley et al. | 99/386 |
| 3,835,760 | 9/1974 | Rekesius | 99/331 |
| 4,176,589 | 12/1979 | Stuck | 99/443 C |
| 4,261,257 | 4/1981 | Henderson et al. | 99/386 |
| 4,488,480 | 12/1984 | Miller et al. | 99/349 X |
| 4,530,276 | 7/1985 | Miller | 99/386 |
| 5,673,610 | 10/1997 | Stuck | 99/393 |
| 5,821,503 | * 10/1998 | Witt | 219/388 |
| 5,960,704 | * 10/1999 | March et al. | 99/349 |

\* cited by examiner

*Primary Examiner*—Timothy F. Simone
(74) *Attorney, Agent, or Firm*—Kennedy Covington Lobdell & Hickman, LLP

(57) ABSTRACT

An apparatus for conveyorized toasting of sandwich buns and like bread and food items simultaneously on opposite sides comprises a central heated platen with two bun transport conveyors traveling in spaced relation along opposite sides of the platen and with a pair of auxiliary heating elements disposed outwardly of the respective food transport runs of the conveyors in facing relation to the opposite sides of the platen. An anti-friction web, e.g., a sheet of polytetrafluoroethylene, is suspended over an enlarged nose element at the upper end of the platen to hang at a spacing from the opposite sides of the platen when food items are not being transported therealong. Static electricity is actively generated in the vicinity of the two conveyors to assist in attracting the suspended portions of the web away from the platen whenever food items are not being toasted. In this manner, heat degradation of the web by the platen is mitigated to extend the useful life of the web.

15 Claims, 2 Drawing Sheets

APPARATUS FOR CONVEYORIZED TOASTING OF BREADS AND LIKE FOOD ITEMS

CROSS-REFERENCE TO RELATED APPLICATION

This disclosure incorporates and has the priority of U.S. Provisional Patent Application Serial No. 60/157,185, filed Sep. 30, 1999, entitled APPARATUS FOR CONVEYORIZED ROASTING OF BREADS AND LIKE FOOD ITEMS.

BACKGROUND OF THE INVENTION

The present invention relates generally to conveyorized food cooking apparatus and, more particularly, to an apparatus for conveyorized toasting of breads and like food items, particularly sliced bread items such as sandwich buns.

The toasting of sliced breads and sandwich buns in the making of hamburgers and other sandwiches is a common practice not only to suit individual tastes and preferences but also to effectively carmelize and seal the faces of the bread to resist absorption of juices and condiments used in the sandwich. Many commercial establishments use bread toasters of the same basic type in widespread home use, comprising a housing with one or more upwardly facing slots for placing multiple slices of bread into a spring-loaded cage by which the bread slices may be lowered into a disposition within the housing between opposed facing heater elements for a predetermined period of time. While such toasters have proven reasonably effective to achieve the intended surface toasting of bread slices, such toasters suffer the significant disadvantages of being relatively slow, often taking in excess of one to one and one-half minutes to achieve the desired surface carmelization of the bread, and are also quite limited in capacity, which makes such equipment relatively undesirable for commercial use in high capacity food preparation establishments such as fast food restaurants. Also, such equipment typically cannot accommodate a variety of differing types and sizes of sliced breads and, in particular, often cannot accommodate hamburger and like sandwich buns or bagels.

Other commercial restaurants utilize a conventional commercial griddle of the type having a stationary base with a flat upwardly facing heated platen and a pivoted cover also comprising a heated platen. While the contact pressure exerted by the pivoted lid on bread slices may enable such griddles to achieve a toasting effect in a somewhat shorter period of time than the conventional toasters of the type described above, the contact pressure may negatively affect the appearance of a toasted bread slice or bun and, further, the capacity of such griddles is still limited by the surface area of the platens.

A conveyorized bread toasting apparatus is described in Miller U.S. Pat. No. 4,530,276, granted Jul. 23, 1985, entitled CONTACT TOASTER and a commercial version of such conveyorized toaster is believed to have achieved a reasonable degree of acceptance within the fast food industry. The conveyorized toaster of the Miller patent is designed particularly for toasting the two halves of hamburger and like sandwich buns and basically utilizes a heated platen centrally disposed within a housing between a pair of oppositely traveling conveyors by which the crown and heel portions of a sandwich bun may be conveyed along the opposite sides of the platen to achieve toasting. While such apparatus addresses the disadvantage of low capacity suffered by the more traditional toasters and griddles described above, the effective increase in capacity has proved to be less than optimal in actual practice because the apparatus still requires one to one and one-half minutes to achieve effective toasting. The Miller patent further teaches only the toasting of the open faces of a sandwich bun, i.e., the sliced surfaces, and thus utilizes the central platen as the sole means of toasting the two bun halves, without any toasting of the outward crown and heel sides thereof, which is believed to be considered by many persons within the restaurant industry and among the general public as an additional disadvantage.

The disadvantages of the conveyorized bread toasting apparatus of Miller U.S. Pat. No. 4,530,276, are overcome by an improved conveyorized bread toasting apparatus disclosed in Stuck U.S. Pat. No. 5,673,610. This bread toasting apparatus is also particularly designed for high speed, large capacity, commercial use. Like the Miller apparatus, this apparatus also provides a central heated platen with two bun transport conveyors traveling in spaced relation along opposite sides of the platen, but in contrast also provides a pair of auxiliary heating elements disposed outwardly of the respective food transport runs of the conveyors in facing relation to the opposite sides of the platen, whereby sandwich buns and like bread and food items are simultaneously toasted on opposites sides. Advantageously, this apparatus in practice has been successful in achieving more uniform toasting of a conventional hamburger bun than with the commercial version of the Miller apparatus in substantially shorter times, generally on the order of only about 20 seconds. To facilitate rapid transport of sandwich bun halves through the toasting apparatus, a sheet coated with polytetrafluoroethylene (e.g., TEFLON7 brand material) is affixed in surface abutment over both side faces of the central heated platen to promote easy sliding movement of the bun halves and to resist sticking. Disadvantageously, however, it has been found in practice that, at the substantially higher temperatures needed to promote such rapid toasting, e.g., with the central platen heated to a temperature on the order of 575° Fahrenheit, the polytetrafluoroethylene sheeting tends to rapidly degrade from continuous direct exposure to such temperatures, with the useful life of such sheeting being on the order of only about two to three weeks before replacement becomes necessary.

SUMMARY OF THE INVENTION

It is accordingly an object of the present invention to provide further improvements in apparatus for conveyorized toasting of breads and like food items, especially hamburger and sandwich buns, of the aforementioned type suitable for high capacity use in fast food restaurants and other similar commercial food preparation operations. A more specific object of the present invention is to provide an improved conveyorized toasting apparatus of the type of the above-identified Stuck U.S. Pat. No. 5,673,610, by which breads may be simultaneously toasted on opposite sides thereof. A further object is to provide an improved arrangement for equipping the central platen of such a conveyorized toasting apparatus with an anti-friction covering along its opposite sides, such as a polytetrafluoroethylene sheet or web, which will better mitigate heat degradation of the covering and substantially improve the useful life thereof.

Basically, the conveyorized bread toasting apparatus of the present invention utilizes a heated toasting element, preferably in the form of a heated platen, with a cover overlying the toasting element for defining a surface for sliding of food items along the toasting element. A conveyor defines a food transport run adjacent the sliding surface of the cover for transporting food items therealong.

The cover preferably is in the form of a generally planar web formed of an anti-friction material having a sufficiently low coefficient of friction to promote sliding movement of food items therealong, e.g., a sheet with a surface coating of polytetrafluoroethylene. In accordance with the present invention, the sheet or web is not attached to the toasting element, e.g., the web or sheet may be simply suspended to extend alongside the toasting element. In a preferred embodiment wherein the platen or other toasting element is oriented vertically, a nose element of a greater lateral dimension than the toasting element is disposed at an upper end thereof and the web or sheet is draped over the nose element to depend alongside the toasting element out of contact therewith, thereby mitigating heat degradation of the web, sheet or other cover by the toasting element.

In accordance with another aspect of the present invention, an appropriate arrangement is provided for urging the sliding surface of the web, sheet or other cover away from the toasting element when food items are not being transported along the sliding surface and, alternatively, for yielding the sliding surface of the cover into contact with the toasting element in response to food items being transported along the sliding surface. In this manner, the web, sheet or other cover may be actively held out of contact with the toasting element whenever food items are not being toasted to further assist in mitigating heat degradation by the toasting element. In a preferred embodiment, the arrangement is designed to produce static electricity in the vicinity of the conveyor to electrostatically attract the web toward the conveyor and away from the toasting element. For example, the conveyor preferably is a belt formed of an elastomeric material trained about at least one roller of a metallic material, thereby tending to produce a static electrical charge.

Further features and advantages of the present invention will be understood from the disclosure of a preferred embodiment of the present toasting apparatus set forth in detail below with reference to the accompanying drawings.

DETAILED DESCRIPTION OF THE PREFERRED EMBODIMENT

Figure 1:
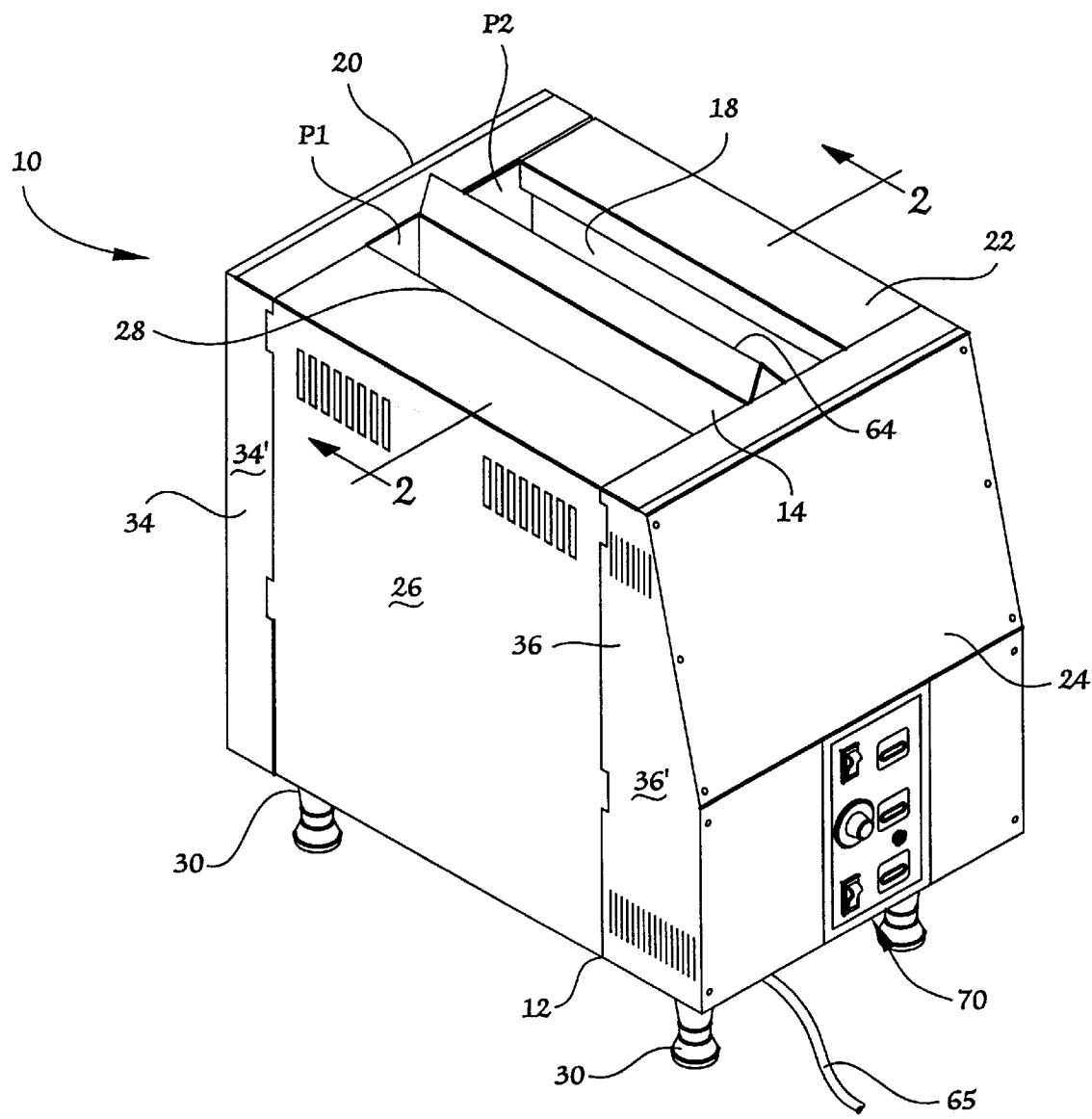
FIG. 1 is a perspective view of a conveyorized toasting apparatus in accordance with one preferred embodiment of the present invention.

Referring now to the accompanying drawings, a conveyorized toasting apparatus according to the present invention is indicated generally at 10 in an embodiment thereof preferred and intended for the automated toasting of hamburger-style sandwich buns on a continuous basis in a commercial restaurant setting. However, those persons skilled in the relevant art will readily recognize and understand that the present toasting apparatus is susceptible of various other specific embodiments, e.g., for toasting other types of breads and even other types of foods. Hence, all such variations on the present invention are intended to be within the scope and substance of the present invention.

As shown, the toasting apparatus 10 basically includes an upstanding frame 12 supporting a vertically oriented central toasting element 14 and a pair of driven food transport conveyor assemblies 16,18 (FIG. 2) vertically oriented at opposite sides of the toasting element 14 in spaced relation thereto to define separate bun transport paths P1,P2 vertically along opposite sides of the toasting element 14. The outward sides and ends of the frame 12 are enclosed by housing panels 20,22,24,26 which collectively serve to define a bun loading opening 28 at the upwardly facing side of the frame 12 into the two bun transport paths P1,P2 and similarly define a bun discharge opening 29 (FIG. 2) at the downwardly facing side of the frame 12 directly beneath the bun transport paths P1,P2. The frame 12 is supported in an elevated position by feet 30 at the opposite frame corners and an angular panel 32 is mounted to the frame to extend laterally beneath the bun discharge opening 29 to deflect toasted buns exiting the transport paths P1,P2 to a forward side of the apparatus 10.

More specifically, the frame 12 comprises a pair of end frame plates 34,36 vertically disposed in spaced parallel facing relation by a plurality of frame members (not shown) extending horizontally therebetween to provide structural rigidity to the frame and to serve as mounts for the housing panels 22,26. Flanges 34',36' extend from the side edges of each of the end frame plates 34,36, respectively, to cooperate with the respective panels 20,24 to define housing enclosures for electronic and drive components of the apparatus 10.

Figure 2:
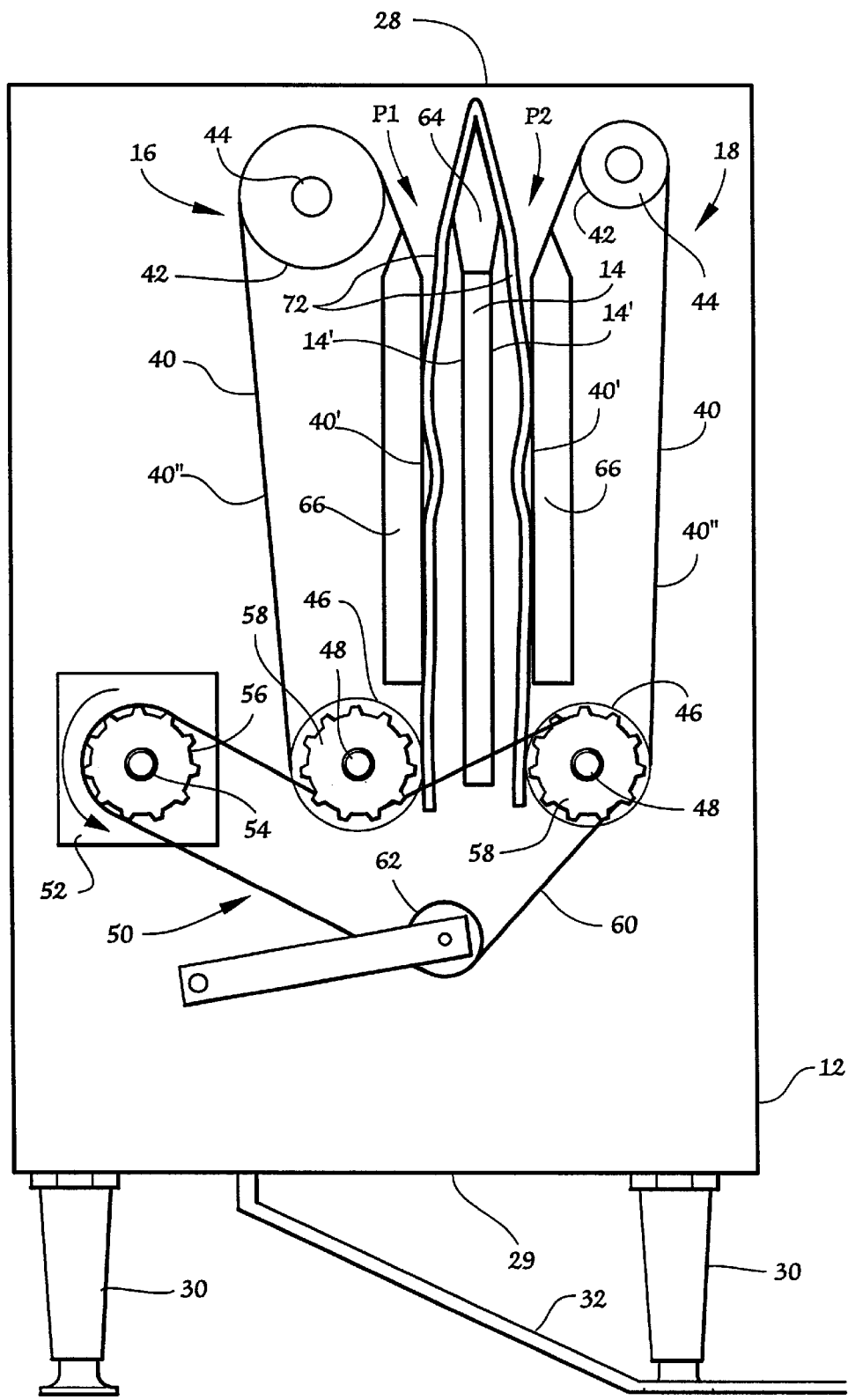
FIG. 2 is a vertical cross-sectional view of the toasting apparatus of FIG. 1, taken along line 2—2 thereof.

As best seen in FIG. 2, each conveyor assembly 16,18 comprises an endless conveyor belt 40 trained about an upper metal roller 42 mounted on a shaft 44 supported rotatably by the end frame plates 34,36 to rotate about a horizontal axis and, similarly, about a lower metal roller 46 mounted on another shaft 48 rotatably supported by the end frame plates 34,36 about a parallel horizontal axis essentially directly below the upper shaft 44. In this manner, each conveyor belt 40 is arranged to travel vertically along a food transporting run 40' at a spacing immediately adjacent to one side of the toasting element 14 and a return run 40" extending vertically at a more outward spacing from the toasting element 14.

The two conveyor belts 40 of the conveyor assembly 16,18 are driven synchronously with one another by a common drive arrangement, indicated generally at 50 in FIG. 2. The drive arrangement 50 includes an electric drive motor 52 mounted to one of the end frame plates 34,36, with the drive shaft 54 of the motor 52 having a drive sprocket 56 rigidly fixed thereto. Similarly, the ends of the lower conveyor shafts 48 of the two conveyor arrangements 16,18 carry respective drive sprockets 58. An endless drive chain 60 extends about the drive sprockets 56,58 and also about an idler sprocket 62 pivotably supported by the adjacent end frame plate. If necessary or desirable, the drive motor 52 may be a variable speed motor to enable adjustment of the transport speed of the conveyor belts 40.

In this manner, the drive motor 52 is effective upon energization to drive the chain 60 and, in turn, drive the conveyor belts 40 in opposite directions under which the food transporting run 40' of each conveyor belt 40 travels downwardly alongside the respective facing side of the toasting element 14, thereby to transport buns downwardly through each bun transport path P1,P2 from the bun loading opening 28 to the bun discharge opening 29.

The toasting element 14 is fabricated preferably in the form of a platen having a plate-like configuration with substantially flat opposed outward faces 14', preferably formed of a sheet metal or other suitable heat conductive material. The platen 14 houses interiorly one or more electrically operated resistance-type heating elements (not shown) disposed in contact with the opposed outward faces 14' to conduct heat energy thereto. As also shown in FIG. 2, a pair of resistance heating elements 66, which may be of any suitable conventional type, are respectively mounted between the end frame plates 34, 36 to extend between the food transporting and return runs 40', 40" of the two conveyor belts 40 in facing disposition to the opposite respective surfaces 14' of the platen 14. In this manner, the platen 14 and the opposed heating elements 66 serve to apply heat energy simultaneously to opposite sides of sandwich buns transported along the bun transport paths P1,P2 by the two conveyor assemblies 16,18 so as to effect toasting of the opposite sides of such buns.

Appropriate electronic control componentry for energizing and adjustably controlling the conveyor drive motor 52, the heating element 66, and the heating elements within the platen 14 are housed within the enclosure outwardly of the end frame plate 36, into which operating electrical current for the toasting apparatus 10 is delivered through a single electrical supply cord 65. Various electrical control arrangements for the conveyor assemblies 16,18 and the heating elements of the toasting apparatus 10 are known and will be apparent to those persons skilled in the art. Such electrical control arrangements do not represent the novel aspects of the present invention and, hence, it is not believed to be necessary to describe the details of the electrical control componentry and circuitry herein. Essentially, the control arrangement provides basic operational control devices to enable actuation and deactuation of the toasting apparatus 10, such as on-off switches for actuating the conveyor drive motor 52 and energization of the platen 14 and the heating elements 66 and a rheostat or similar type of adjusting switch for modulating the driven speed of the conveyors 40, all collectively indicated generally at 70. Other control devices not normally to be accessed by unauthorized personnel may be housed within the enclosure of the end frame plate 36, such as a thermostatic adjustment for controlling the heated temperature of the platen 14 and the heating elements 66.

As previously indicated, it is desirable to operate the platen 14 and the resistance heating elements 66 at a relatively high temperature, e.g., on the order of 525° Fahrenheit, in order to achieve surface temperatures sufficient to promote the most rapid toasting of sandwich buns (e.g., on the order of 425° F.), and, in turn, to enable drive operation of the conveyor belts 40 at correspondingly high bun transport speeds. In turn, it becomes increasingly important that the sandwich buns slide easily and with minimal friction along the opposite outward surfaces 14' of the platen 14 so as to resist sticking to the buns. Most preferably, the platen 14 is covered with a suitable polymeric material having a sufficiently low coefficient of friction, such as polytetrafluoroethylene, but as previously described, such polymeric materials, and polytetrafluoroethylene in particular tend to degrade rapidly when exposed to temperatures as high as aforementioned.

The present invention accordingly provides a novel and unique solution to the foregoing problem. As best seen in FIG. 2, a nose element 64 is affixed to the upwardly facing end of the platen 14 and is formed of a tapering configuration extending from a narrow upper point wideningly outwardly to a lateral dimension directly above the upper end of the platen 14 which is wider than and protrudes slightly laterally beyond each opposite outward face 14' of the platen 14. The tapered configuration of the nose element 64 advantageously facilitates loading of sandwich buns into each bun transport path P1, P2 through the bun loading opening 28.

A center-folded generally planar web 72 of a flexible anti-friction material, preferably a sheet formed of or surface coated with polytetrafluoroethylene, is draped over the nose element 64 with the center fold of the web 72 receiving the narrow upper end of the nose element 64 such that opposite planar extents of the web 72 are suspended therefrom to depend downwardly alongside the opposite respective outward surfaces 14' of the platen 14.

Due to the greater lateral dimension of the nose element 64 immediately above the platen 14, the opposite downward extents of the web 72 tend to hang at a slight outward spacing from the opposite platen surfaces 14' whenever a sandwich bun is not being transported by the conveyor belts 40 along the platen 14. In turn, therefore, the web 72 is not as fully exposed to the heat generated by the platen 14 as would be the case if the web 72 were affixed in direct surface abutment to the opposite faces 14' of the platen 14 which thereby sufficiently mitigates against heat degradation of the web 72 to substantially extend the useful functional life of the web 72.

To further promote this described effect, the present invention also provides an arrangement by which the opposite sides of the web 72 are actively held away from the platen 14 whenever sandwich buns are not being transported there along. Specifically, the conveyor belts 40 are preferably formed of a silicone or other rubberized or similar elastomeric material which not only promotes firm frictional engagement of the sandwich buns to maintain secure control over the sliding transport of the buns along the surfaces 14' of the platen 14, but also tends to produce a static electrical charge owing to the continual movement of the belts 40 over the metallic rollers 42, 46 about which the belts 40 are trained and the continual sliding movement of the belts 40 over the surfaces of the heating elements 66. Normally, the electrostatic charges thereby generated are viewed to be disadvantageous and, indeed, steps are commonly taken to discharge such static electricity, e.g., by providing grounding fibers in the belts or by similar grounding means.

In accordance with the present invention, however, such grounding means is omitted so as to intentionally promote the generation of static electricity in the vicinity of conveyor belts 40 thereby to electrostatically attract the portions of the web 72 suspended from the nose element 64 toward the conveyor belts 40 and thereby away from the opposite surfaces 14' of the platen 14. In supplementation of the passive tendency of the suspended portions of the web 72 to hang at a spacing outwardly from the platen 14 due to the greater lateral dimension of the nose element 64, the static electricity generated as above described actively tends to hold the web 72 away from the platen 14. As will be understood, the attractive forces generated by the static electricity are sufficiently weak to be easily overcome merely by the force of the conveyor belts 40 transporting a sandwich bun along the bun transport paths P1, P2 whereby, during toasting operation, the suspended portions of the web 72 yield into contact with the opposite surfaces 14' of the platen 14 in response to food items being transported through the paths P1, P2.

As will therefore be understood by persons skilled in the art, the anti-friction web 72 operates in the present toasting apparatus with equal effectiveness to known conveyorized toasting apparatus wherein such a web or other covering is typically affixed in direct surface abutment to the platen, but advantageously the web in the present invention experiences a remarkably and unexpectedly greater useful functional life. In contrast to the known apparatus wherein anti-friction covering webs typically have required replacement after only three to four weeks of use in a commercial restaurant setting, the apparatus of the present invention has successfully employed suspended webs of the type described herein for up to three to four months of useful functional life before requiring replacement. The cost of operation of the apparatus are correspondingly reduced and, advantageously, the apparatus does not require any additional components, parts or materials to achieve these advantages.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. Apparatus for conveyorized toasting of breads and food items, comprising a heated toasting element, a cover overlying the toasting element for defining a surface for sliding items along the toasting element, a conveyor defining a food transport run adjacent the sliding surface of the cover for transporting food items therealong, and means for urging the sliding surface of the cover away from the toasting element when food items are not being transported along the sliding surface and for yielding the sliding surface of the cover into contact with the toasting element in response to food items being transported along the sliding surface, thereby to mitigate heat degradation of the cover by the toasting element.

2. Apparatus for conveyorized toasting of breads and food items according to claim 1, wherein the sliding surface of the cover comprises a generally planar web of a material having a sufficiently low coefficient of friction to promote sliding movement of food items there along.

3. Apparatus for conveyorized toasting of breads and food items according to claim 2, wherein the web comprises a sheet having a surface of polytetrafluoroethylene.

4. Apparatus for conveyorized toasting of breads and food items according to claim 2, wherein the web is unattached to the toasting element.

5. Apparatus for conveyorized toasting of breads and food items according to claim 4, wherein the web is suspended to extend alongside the toasting element.

6. Apparatus for conveyorized toasting of breads and food items according to claim 5, wherein the toasting element is a heated platen presenting a generally flat face, the web extending in generally facing relation to the face of the platen.

7. Apparatus for conveyorized toasting of breads and food items according to claim 5, wherein the toasting element is oriented generally vertically, a nose element of a greater lateral dimension than toasting element is disposed at an upper end thereof, and the web is draped over the nose element to depend alongside the toasting element essentially out of contact therewith.

8. Apparatus for conveyorized toasting of breads and food items according to claim 2, wherein the urging and yielding means comprises means for attracting the web toward the conveyor.

9. Apparatus for conveyorized toasting of breads and food items according to claim 8, wherein the attracting means comprises means for producing static electricity in the vicinity of the conveyor for electrostatically attracting the web.

10. Apparatus for conveyorized toasting of breads and food items according to claim 9, wherein the conveyor comprises a belt of elastomeric material trained about at least one roller of a metallic material for tending to produce a static electrical charge.

11. Apparatus for conveyorized toasting of breads and food items according to claim 2, and further comprising an auxiliary heated toasting element disposed adjacent the food transporting run of the conveyor opposite from and in facing relation to the first-mentioned toasting element, the first mentioned and auxiliary toasting elements being effective for simultaneously toasting food items on opposite sides thereof.

12. Apparatus for conveyorized toasting of breads and food items according to claim 1, wherein the cover overlies first and second sides of the toasting element for defining the first-mentioned sliding surface along the first side of the toasting element and a second sliding surface along the second side of the toasting element, the food transport run of the first-mentioned conveyor being adjacent the first sliding surface of the cover, and a second conveyor defining a second food transport run adjacent the second sliding surface of the cover for transporting food items therealong.

13. Apparatus for conveyorized toasting of breads and food items, comprising a heated toasting element oriented generally vertically a nose element of a greater lateral extent than the toasting element disposed at upper end thereof, a generally planar web of a flexible anti-friction material attached to the nose element to depend therefrom alongside the toasting element essentially out of contact therewith and deflectable into contact with the toasting element to present a surface for sliding of food items along the toasting element, and a conveyor defining a food transport run adjacent the sliding surface of the cover for transporting food items therealong.

14. Apparatus for conveyorized toasting of breads and food items according to claim 13, wherein the web comprises a sheet with a surface coating of polytetrafluoroethylene.

15. Apparatus for conveyorized toasting of breads and food items according to claim 13, wherein the web is unattached to the toasting element.

* * * * *